United States Patent [19]

Frank et al.

[11] 4,145,894

[45] Mar. 27, 1979

[54] APPARATUS FOR DISPENSING CARBON DIOXIDE SNOW ON ARTICLES

[75] Inventors: Martin Frank, Cologne; Karl Frank, Linz; Gerd Braun, Cologne, all of Fed. Rep. of Germany

[73] Assignee: Kohlensaure-Werke Rudolf Buse Sohn, Bad Honningen, Fed. Rep. of Germany

[21] Appl. No.: 818,763

[22] Filed: Jul. 25, 1977

[30] Foreign Application Priority Data

Jul. 29, 1976 [DE] Fed. Rep. of Germany ....... 2634164

[51] Int. Cl.$^2$ .............................................. F25C 5/18
[52] U.S. Cl. .......................................... 62/344; 62/35; 62/381; 222/146 C
[58] Field of Search ...................... 62/76, 344, 381, 35; 222/146 R, 146 C

[56] References Cited

U.S. PATENT DOCUMENTS

| 2,449,132 | 9/1948 | Lucia | 62/344 |
| 3,226,944 | 1/1966 | Connors | 62/344 |
| 3,605,430 | 9/1971 | Conti | 62/344 |
| 3,932,155 | 1/1976 | Pietrucha et al. | 62/76 |

Primary Examiner—Ronald C. Capossela
Attorney, Agent, or Firm—Laurence R. Brown

[57] ABSTRACT

Apparatus is provided for automatically dispensing $CO_2$ snow on articles moved by a conveyer underneath a snow storage container-dispenser outlet opening. The dispensing is controlled by a motor driven segmented drum with brush-like elastic blades closing the dispenser outlet opening actuated when an article is moved into place thereunder. The snow is generated from liquid $CO_2$ flowing through cooling coils in the snow and dispensed through a nozzle in the upper portion of the container in response to capacity sensing means such as a photocell level detector to thereby keep the container snow level constant.

8 Claims, 2 Drawing Figures

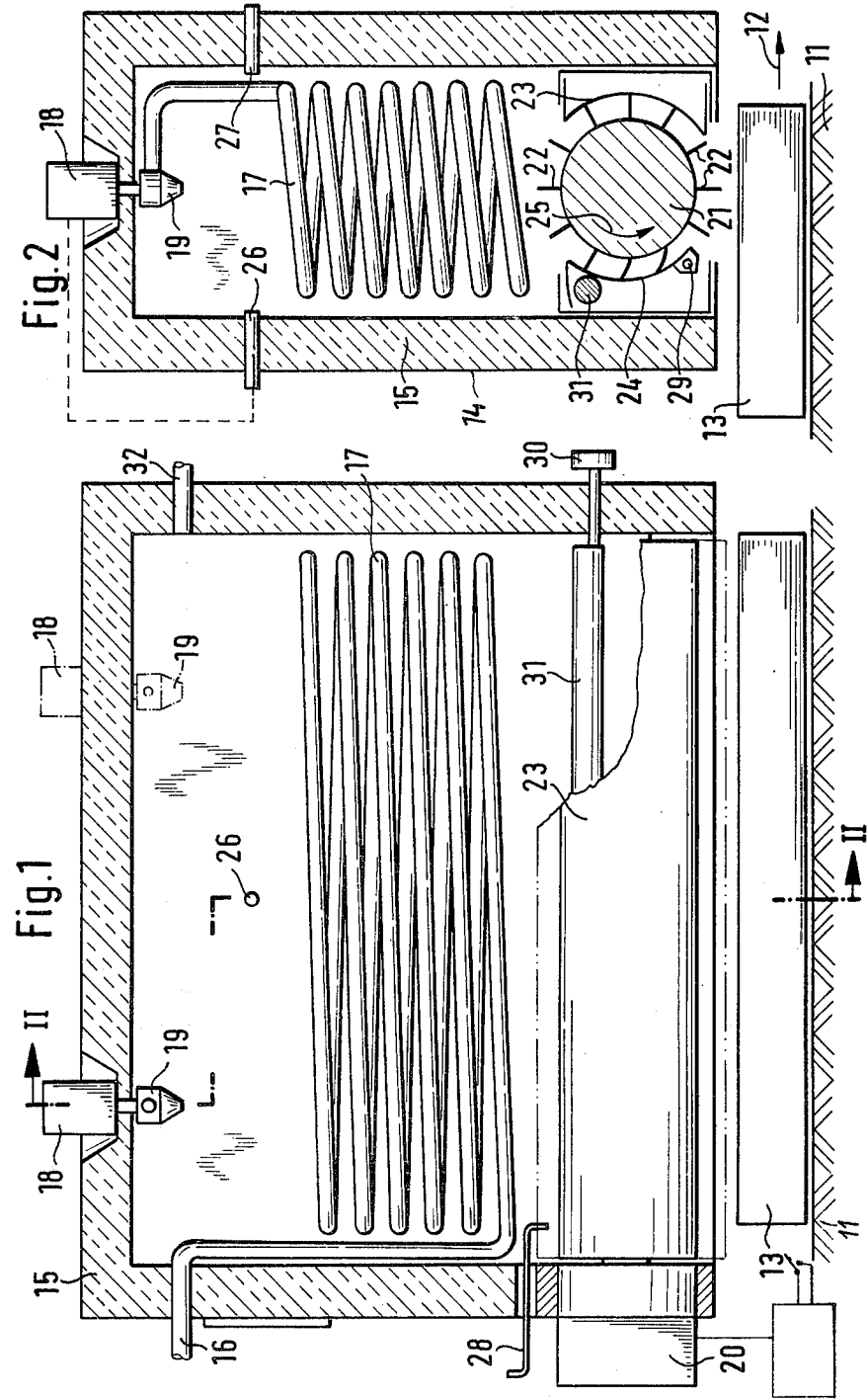

APPARATUS FOR DISPENSING CARBON DIOXIDE SNOW ON ARTICLES

This invention relates to apparatus for dispensing $CO_2$ snow on articles presented by conveyer means under an outlet opening of an insulated container which has inside coiled pipes through which liquid $CO_2$ passes and flows through a nozzle under control of a valve that is opened by switching means on the conveyer by an article in proper position.

BACKGROUND OF THE INVENTION

This type of apparatus will quickly cool perishable goods such as freshly slaughtered poultry packed in shipping cartons. For that kind of apparatus so-called snow heads are known.

Part of the $CO_2$ piping is disposed inside a container in the form of a coiled pipe as a heat exchanger for cooling liquid $CO_2$ from a $CO_2$ store with the objective of an improved production of snow and accordingly a lesser loss of $CO_2$ in the form of gas.

OBJECT OF THE INVENTION

There is not heretofore a satisfactory production of this kind of apparatus, so that the problem of the invention is to construct apparatus with the smallest possible consumption of $CO_2$ while completely snow covering articles in a complete process automatically conveying the articles continuously with transport apparatus.

BRIEF DESCRIPTION OF THE INVENTION

The solution of this problem is resolved by an upper closed container as a snow storage means with an output opening closed by controllable dispensing apparatus for uniformly dispensing $CO_2$ thereout, with a valve operated nozzle for making $CO_2$ snow in the upper part of the storage means closable by a capacity sensor and an outlet for $CO_2$ gas accumulated in the snow-free space of the storage container returning to a $CO_2$ sump.

In operation a stationary $CO_2$ snow storage device with internal coiled pipes through which liquid $CO_2$ flows to an outlet nozzle serves as a heat exchanger so that the $CO_2$ can remain longer to achieve the limiting temperature of the $CO_2$ snow. This results in an optimum transfer of the liquid $CO_2$ into snow. Furthermore, the $CO_2$ gas necessarily formed in the snow production is recovered from the storage device by an escape means so that it is not lost from the process.

Further, it is not necessary to accommodate the spray out of the nozzle to the characteristics of the article to be snow covered. On the contrary, the problem of snow covering caused by the heat that is almost always carried by the article being snowed, is solved by the controlled dispensing apparatus having a plugged opening of the snow storage container, so that the limitations on the nozzle except for the best possible desirable snow production in the storage container can be reduced.

By help of appropriate additional apparatus the objectives of the invention are more closely achieved. Thus, advantageously the dispensing apparatus is a motor driven segmented drum with axially disposed elastic blades on the outer surface which contact bordering walls alongside the outlet opening. These blades serve as ribbed brushes and it is possible to swing one of the bordering walls on which the blades slide downwardly about an axis parallel to the drum axis in orer to adjust the entrance way between the outer surface of the drum and the bordering wall. Also the length of the output opening can be adjusted by means of an adjustable slide which reaches through a container sidewall to touch the drum so that only the output quantity per cell segment necessary covers the entire surface of the article to be snowed and thus the object of consuming the smallest possible quantity of $CO_2$ is achieved.

Also it is possible to make a simple arrangement serving as a capacity sensor with a photosensitive apparatus in the upper portion of the storage container.

A particular embodiment of the invention is described with reference to the drawing, which shows:

FIG. 1, the apparatus in a vertical section;

FIG. 2, a cross section through the apparatus along line II—II of FIG. 1.

In a simplified embodiment, the transport arrangement 11 moves continuously in a given direction as shown in FIG. 2 by arrow 12 to move an article to be snowed, here carton 13, generally under the snowing apparatus 14. With respect to the transport arrangement 11, as found in a later description, any conventional switching equipment operates the snowing apparatus automatically as the article 13 to be snowed is moved into place.

The snowing apparatus 14 has an outer closed shell 15 of a good heat insulating material, into which at 16 runs piping forming cooling coils 17 for liquid $CO_2$. These cooling coils are placed near the walls of shell 15. The topmost coil runs through the upper region of the shell 15 serving as a storage container for snow formed of $CO_2$ released by nozzle 19 controlled in a conventional manner by magnetic valve 18.

The lower side of the storage container 15 is closed by a segmented drum 21 rotated at a constant speed by motor 20. Along its axial circumference run elastic brush-like blades 22, which over a few circumferential sectors are in contact with the bordering walls 23, 24. The bordering walls 23, 24 and segmented drum 21 together close the storage container and with constant speed in the rotation direction of arrow 25, conveys $CO_2$ snow out of the storage container 15. This snow will be discharged out of the lower opening of the storage container 15 upon the article 13 to be snowed, because of the elasticity of the blades.

In another position within the storage container capacity is photosensing equipment 26, 27, operable so that when the $CO_2$ snow in the storage container reaches the level of the sensors the magnetic valve operates to close the nozzle 19.

For controlling the snow delivery quantity as a function of the characteristics of the article 13 to be snowed, a slide 28, extending inwardly from a side wall to grasp the segmented drum, serves to limit a portion of the outlet of the container. The output of the segmented drum 21 is adaptable so that one bordering wall 24 on the side of the outlet opening, on which the brush blades slide downwardly, swings about axis 29 parallel to the axis of drum 29 by means of an outside extending control knob 30 operating movable eccentric 31. Thereby the entrance gap between the outside surface of drum 21 and the bordering wall is controlled.

The mode of operation of the equipment follows. An article 13 to be snowed moves on the transport arrangement 11 up to the unoperated appropriate switching arrangement and simultaneously starts the motor 20 turning the segmented drum 21 and opens the nozzle 19. The liquid $CO_2$ held in the coiled pipes 17, well cooled by the snow stored in the storage container 15 flows out through the nozzle 19 and is predominantly transformed into $CO_2$ snow. The $CO_2$ gas unavoidably resulting will escape out of the upper regions of the storage container through a return conduit 32 to a sump.

The turning segmented drum 21 conveys $CO_2$ snow between its brush blades 22 to the lower opening and by means of the elasticity of the brush blades slings the snow on the article 13 to be snowed, while at the same time the snow storage in the storage container by means of the nozzle 19 is continuously replenished. When the article to be snowed passes on, by means of a second switching mechanism heretofore unoperated, the motor 20 of the segmented drum 21 is shut off so that no more $CO_2$ snow can be delivered. This terminal switch, however, leaves the magnetic valve 18 open so that the $CO_2$ snow continues until the storage level reaches the capacity sensors 26, 27, and then the nozzle 19 is closed. Enough snow storage thereby remains for the next snowing process and also especially for the cooling of the coiled pipes 17 containing available liquid $CO_2$.

With a longer storage container it is suitable to provide two or more snow producing nozzles and in the storage tank as many similar divisions as in FIG. 1 are indicated on the right side by dotted lines 18–19.

What is claimed is:

1. Apparatus for dispensing $CO_2$ snow on an article comprising in combination,
    an insulated storage container for $CO_2$ snow,
    a set of coiled heat transfer pipes within said container for passage of liquid $CO_2$,
    a nozzle connected for outlet of the liquid $CO_2$ from said pipes within said container in the form of snow to thereby be disposed on the pipes for cooling of the liquid $CO_2$ and storage,
    a dispenser at the lowermost part of said container for discharging stored snow, and
    an outlet for gaseous $CO_2$ in the uppermost part of said container.

2. The apparatus defined in claim 1 including conveyer means for presenting an article under said dispenser to receive snow discharged from said container, and means selectively activating said dispenser only when an article is in position to receive discharged snow.

3. The apparatus defined in claim 2 including a control valve for discharging $CO_2$ from said nozzle and control means causing said nozzle to discharge $CO_2$ automatically as said article is moved under said dispenser.

4. Apparatus as defined in claim 3 including level sensing means coupled to said control valve to turn off $CO_2$ from said nozzle when the level of snow in said container exceeds a predetermined limit.

5. Apparatus as defined in claim 1 wherein the dispensing apparatus comprises a rotatable drum plugging a discharge opening at said lowermost part of the container.

6. Apparatus as defined in claim 5 wherein said drum is segmented by elastic blades which contact adjacent walls about said discharge opening.

7. Apparatus as defined in claim 5 including a movable slide entering the container to contact the drum over a portion of its axial length thereby controlling the quantity of snow discharged by said dispenser.

8. Apparatus for dispensing $CO_2$ snow on an article comprising in combination,
    an insulated storage container for $CO_2$ snow,
    a set of coiled heat transfer pipes within said container for passage of liquid $CO_2$,
    a nozzle connected for outlet of the liquid $CO_2$ from said pipes within said container in the form of snow to thereby be disposed on the pipes for cooling of the liquid $CO_2$ and storage,
    a dispenser at the lowermost part of said container for discharging stored snow comprising a rotatable drum plugging a discharge opening at said lowermost part of the container, elastic blades disposed on and segmenting said drum, adjacent walls disposed about said discharge opening and in contact with said blades,
    a pivotable adjacent wall controllable to control the width of the entrance gap for stored snow into the space between said drum and the last said adjacent wall, and
    an outlet for gaseous $CO_2$ in the uppermost part of said container.

* * * * *